United States Patent [19]
Bleacher

[11] Patent Number: 5,738,045
[45] Date of Patent: Apr. 14, 1998

[54] ANIMAL RESTRAINT DEVICE

[75] Inventor: Gary W. Bleacher, Lambertville, N.J.

[73] Assignee: American Cyanamid Company, Madison, N.J.

[21] Appl. No.: 376,351

[22] Filed: Jan. 23, 1995

Related U.S. Application Data

[63] Continuation-in-part of Ser. No. 999,492, Dec. 31, 1992, Pat. No. 5,383,425.

[51] Int. Cl.$^6$ ............................................. A01K 1/06
[52] U.S. Cl. ............................................. 119/751
[58] Field of Search ............................. 119/751, 752, 119/754, 755, 756, 757

[56] References Cited

U.S. PATENT DOCUMENTS

| | | | |
|---|---|---|---|
| 2,396,928 | 3/1946 | Parsons | 119/98 |
| 3,099,249 | 7/1963 | Newhouse, Jr. | 119/98 |
| 4,995,335 | 2/1991 | Wright | 119/98 |
| 5,383,425 | 1/1995 | Bleacher | 119/729 |

*Primary Examiner*—Thomas Price
*Attorney, Agent, or Firm*—Mark P. Stone

[57] ABSTRACT

A swine restraint device includes a V-shaped trough having angular blocks defining a centrally disposed, longitudinally extending channel. The angular blocks provide wedge means for supporting a swine within the trough, and at least a portion of the channel defines a bottom opening through which the feet of the swine extend when the trough is elevated relative to a stationary supporting surface. At least one yoke-shaped self-adjusting back restraint cooperates with the trough to restrain a swine in a predetermined position within the trough when the trough is elevated relative to the supporting surface. A pair of opposed shoulder stops mounted in a forward position within the trough further restrain forward motion and immobilize swine within the trough. The animal restraint device is designed efficiently to humanely and temporarily immobilize animals, particularly swine, for many purposes including weighing, veterinary exams and procedures, medication, implantation, and euthanasia. In a further aspect of the invention, the yoke-shaped back restraint cooperates with a longitudinally extending slat pivotably mounted proximate to the upper portion of the yoke to more firmly, securely and comfortably engage the animal in a restrained position within the device. In other embodiments of the invention, the free ends of the yoke-shaped back restraint are each received in telescoping relationship in tubular elements. In still another embodiment, the free ends of the yoke-shaped back restraint are resiliently mounted to a supporting surface.

20 Claims, 7 Drawing Sheets

5,738,045

ANIMAL RESTRAINT DEVICE

The present patent application is a continuation-in-part of U.S. Ser. No. 07/999,492, filed Dec. 31, 1992 and entitled "Animal Restraint Device", now U.S. Pat. No. 5,383,425, issued on Jan. 24, 1995.

BACKGROUND OF THE INVENTION

The present invention is directed to an animal restraint device, and in particular, a device for temporarily immobilizing swine for the purposes of implantation, veterinary examination and procedure, medication and other procedures during which it is necessary to firmly restrain the animal in a predetermined, substantially immobile position. The known or conventional animal restraint devices exhibit certain distinct disadvantages. Snares or headgates used to restrain swine are considered by some as treating the swine inhumanely. Other restraint devices support the restrained animal at its sternum which can result in discomfort and stress to the animal. The known, conventional restraint devices are not designed to efficiently immobilize the restrained animal or enhance the efficiency of the procedure or expedite the procedure being performed on the animal that is temporarily immobilized within the restraint device.

It is the primary object of the present invention to provide an animal restraint device, particularly a swine restraint device, which overcomes the known disadvantages of the conventional restraint devices. The present invention provides a swine restraint device designed to more humanely and temporarily immobilize swine restrained therein including means for laterally supporting the swine in the device. The restraint device is further designed and provided with structure to immobilize swine in a manner resulting in enhanced efficiency of the procedures performed on the restrained animal.

The objects of the invention are achieved by a design incorporating cooperating supporting and restraint structure for efficient and humane immobilization and restraint of animals within the device. Other objects and advantages of the present invention will become apparent from the following discussion in conjunction with the drawings illustrating the best mode for carrying out the invention.

SUMMARY OF THE INVENTION

An animal restraint device includes a longitudinally extending trough having inner, opposed longitudinally extending blocks having angularly inclined surfaces defining a substantially centrally disposed channel extending between said opposed blocks along a bottom surface of the trough. The channel defines a centrally disposed, longitudinally extending opening in the bottom surface of the trough, and the feet of swine restrained in the trough extend downwardly through the central opening in the bottom surface to further immobilize the swine when the trough is elevated above a predetermined fixed supporting surface. The opposed angled blocks of the trough provide surfaces for laterally supporting a swine restrained in the device, and the opposed angled blocks diverge away from each other in a direction from the front to the rear of the trough to substantially conform to the shape of the swine. The surfaces of the opposed angled blocks are smooth to eliminate traction or friction points for reducing the possibility of upward movement by the swine temporarily restrained within the device.

The restraint device further includes front and rear doors for initially confining the swine within the open-topped trough device, and further includes a pair of opposed shoulder stops. Each shoulder stop is mounted respectively to one of the opposed longitudinally extending blocks towards the front of the trough device. At least one arcuate yoke-shaped back restraint bridges the opposed angled pair of blocks within the trough, and cooperates with means for elevating the trough structure relative to the fixed supporting surface to firmly retain and restrain the swine temporarily immobilized within the restraint device.

In operation, a swine is placed within the trough, and initially restrained therein by virtue of forward and rear doors removably mounted to the front and rear ends of the trough. The trough is elevated above a fixed supporting surface on which the bottom surface of the trough initially rests by conventional elevating means such as an hydraulic lift system or a detachable chain hoist device. As the trough is raised relative to the supporting surface, the legs of the swine within the device drop through the centrally disposed opening extending longitudinally through the bottom surface of the trough, and the swine is laterally supported by the opposed angled blocks extending longitudinally through the trough. A cooperating yoke-shaped, arcuate, self-adjusting restraint element engages the back of the swine when the trough is elevated to a predetermined height, and a downwardly directed force is exerted on the swine by the restraint element to further wedge the swine into the V-shaped opened channel defined by the opposed angled longitudinally extending blocks. The swine is further immobilized by the forwardly oriented shoulder stops mounted to the opposed blocks, and also as a result of its feet extending downwardly through the centrally disposed opening in the bottom surface of the trough when the trough is elevated to a height sufficient to prevent its feet from engaging the stationary fixed supporting surface therebelow. The front and rear trough doors may be selectively removed from the restraint device to provide substantially unimpeded access to the immobilized swine for the purpose of performing a desired procedure on the restrained animal.

In further aspects of the invention, at least one longitudinally extending slat is pivotably mounted proximate to the upper, inner arcuate portion of the yoke-shaped back restraint. The slats more uniformly distribute the downwardly directed restraining force of the yoke-shaped back restraints along the entire back of the restrained animal. In this manner, the animal is more firmly, securely and comfortably restrained within the device for the time necessary to perform the required procedure on the restrained animal.

In another aspect of the invewntion, the opposed free ends of the yoke-shaped back restraint are resiliently mounted to the lower fixed supporting surface of the device to enable the back restraint to firmly engage the back of the animal restrained in the device.

In a further aspect of the invention, the opposed free ends of the yoke-shaped back restraint are each received in telescoping relationship in tubular elements mounted to a lower supporting surface of the restraint device and extending upwardly therefrom. The supporting surface, the tubular elements, and the yoke-shaped back restraint are elevated and lowered as a single unit to selectively elevate and lower an animal restrained within the device. The telescoping relationship between the tubular elements and the yoke-shaped back restraint enables selective adjustment of the height of the yoke-shaped restraint by suitable adjustment means.

DISCUSSION OF THE BEST MODES FOR CARRYING OUT THE INVENTION

Figure 1:
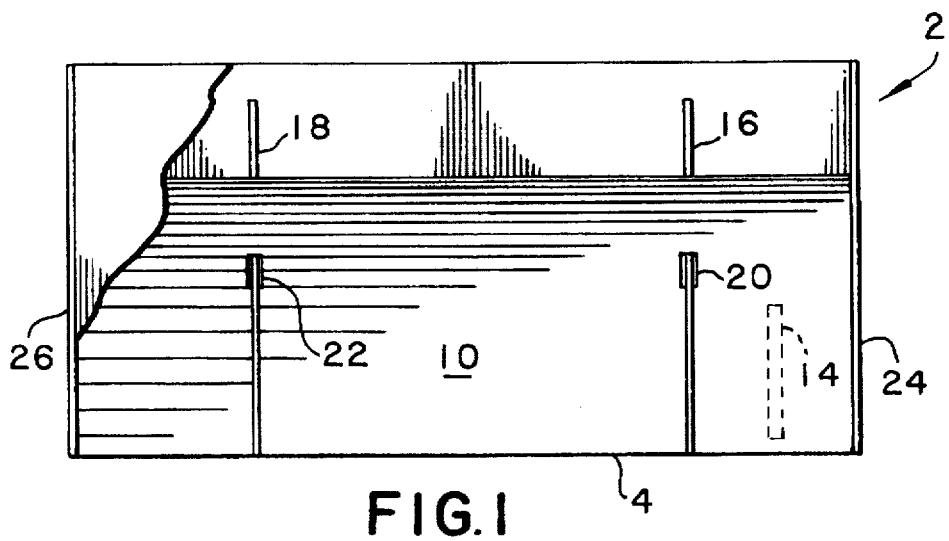
FIG. 1 of the drawing illustrates a side elevational view of an animal restraint device in accordance with the present invention.

FIGS. 1–4 of the drawing illustrate an animal restraint device in accordance with the present invention. The device is particularly useful for temporarily restraining and immobilizing swine for the purpose of performing one or more procedures including implantation, medication, veterinary exams, veterinary procedures and euthanasia. The device is designed to reduce physical discomfort and stress to the swine, to increase the efficiency in the manner in which the procedure is performed on the animal restrained within the device, and to expedite the time required to perform the procedure by providing efficient restraint of the animal.

Referring to FIGS. 1–4 of the drawing, a swine restraint device 2 comprises a longitudinally extending, opened top trough structure. The device 2 includes a bottom surface 4 and upwardly extending opposed perpendicular sidewalls 3 and 5. As illustrated most clearly by FIG. 1, the bottom surface 4 is substantially planar and level, and is oriented substantially along a horizontal plane. An opening 6 defined in the central portion of the bottom surface 4 of the trough extends longitudinally between a front end wall 24 and a rear end wall 26 of the trough 2. The longitudinally extending opening 6, which extends substantially along the entire bottom surface 4 (See FIG. 4), diverges in a direction from the front to the rear of the trough.

The trough 2 includes two opposed blocks 8 and 10 each having a sloped or inclined angular surface. The blocks are located within the trough and extend longitudinally adjacent to trough sidewalls 3 and 5 respectively. The blocks define a substantially V-shaped cross sectional configuration of the trough, and the longitudinally extending opening 6 is defined by the space or gap between the opposed blocks 8 and 10. As most clearly illustrated by FIG. 4, the blocks 8 and 10 each continuously narrow in width and thereby diverge from each other in a direction from the front end 24 to the rear end 26 of the trough. As will be discussed in greater detail below, the opposed, laterally extending diverging blocks 8 and 10 provide a lateral supporting surface or wedge for a swine temporarily restrained within the device 2.

The restraint device illustrated by FIGS. 1–4 includes opposed forward shoulder stops 12 and 14. These stops are mounted respectively to forward portions of the laterally extending blocks 8 and 10, and cooperate with the blocks to restrain and temporarily immobilize a swine within the trough, as will be discussed in greater detail below. The restraint device 2 further includes a pair of back restraints 16 and 18. The back restraint 16 bridges forward portions of the laterally extending blocks 8 and 10, while the back restraint 18 bridges rear portions of the blocks 8 and 10. Each of the pair of back restraints 16 and 18 is arcuate or yoke-shaped, and the two free ends of each of the restraints are received within pairs of opposed openings defined in the respective opposed laterally extending blocks 8 and 10. As most clearly illustrated by FIG. 4, the free ends of the forward restraint 16 are received within openings 20 defined in forward portions of the opposed blocks 8 and 10, while the free ends of the rear restraint 18 are received within openings 22 defined in rear portions of the opposed blocks 8 and 10. As will be further discussed below, the free ends of each of the restraints 16 and 18 are affixed to a stationary supporting surface beneath the trough so that both restraints remain fixed relative to the trough when the trough is raised relative to the stationary supporting surface.

The trough 2, the angled blocks 8 and 10, the shoulder stops 12 and 14, and the back restraints 16 and 18 can be formed from any suitable material such as galvanized metal, sheet metal or steel. The back restraints can also include a padding material. The shoulder stops may also be formed from wood, while other components of the device may be formed from a high strength plastic. Preferably the sloped or inclined surfaces of the opposed laterally extending blocks 8 and 10 are finished to be smooth and do not include any friction or traction points. The forward portion of the centrally disposed, longitudinally extending opening 6 is approximately between 4–6 inches wide while the rearmost and widest portion of the opening is approximately between 6–8 inches. The angle of the sloping surfaces of the opposed blocks 8 and 10 illustrated in the drawing is approximately 70 degrees. Preferably, the angle of the opposed sloping surfaces of the blocks will be greater than 45 degrees (e.g., closer to vertical than horizontal). The forward end 24 and the rear end 26 of the restraint device 2 are preferably defined by removable front and rear end walls, and the front end wall is preferably formed from a transparent material such as plexiglass. The width of the diverging and longitudinally extending opening 6 defined in the center of the bottom surface 4 of the restraint device 2 is sufficiently narrow to wedge the body of the swine in the V-shaped channel defined between the opposed blocks 8 and 10, and the opening is sufficiently wide to enable the legs of the swine to extend downwardly through the opening 6 when the restraint device is elevated above a fixed supporting surface.

In operation of the restraint device illustrated by FIGS. 1–4, a swine enters the trough 2 through the rear surface thereof, and a removable rear wall 26 is thereafter mounted to the rear of the trough. A removable front end wall 24 defines the front portion of the trough. Preferably the front wall 24 is formed from a transparent material so that the swine enclosed within the open-topped trough can see outside the trough through the front wall to reduce stress and avoid panic. The swine is initially restrained by the V-shaped wedge defined between the opposed laterally extending, inclined side blocks 8 and 10. Because the sloped surfaces of the opposed blocks are smooth, any attempt by the swine to climb out of the V-shaped channel is impeded. The forwardly oriented, opposed pair of shoulder blocks 12 and 14 impede any forward movement of the swine, while the rear end wall 26 impedes any reverse movement by the swine. The rearwardly diverging configuration of the V-shaped channel defined between the opposed side blocks 8 and 10 generally conforms to the configuration of the body of the swine so as to firmly and comfortably retain the swine in the channel and also laterally support the swine by the sloping surfaces of the opposed blocks 8 and 10.

The bottom surface 4 of the restraint device 2 is initially supported by a fixed supporting surface or floor which seals the longitudinally extending opening 6. Accordingly, the legs of a swine received within the V-shaped channel wedge of the restraint device 2 are initially confined by the fixed supporting surface beneath the bottom surface of the restraint device. The restraint device of the present invention further includes conventional means for selectively elevating the trough relative to the fixed supporting surface. The means for elevating are conventional and can include a manual hoist and chain connectable to the trough for elevating the bottom surface 4 of the restraint device above the fixed supporting surface. Preferably the means for elevating will include a hydraulic lift for quickly and automatically elevating the trough above the stationary supporting surface to reduce the stress on the swine restrained within the trough and to minimize the time in which the swine is immobilized within the restraint device. The trough is raised a sufficient height above the fixed supporting surface such that the feet of the swine are fully extended beneath the bottom surface of the restraint device 4 through the central opening 6 and are maintained above the fixed supporting surface upon which the trough initially rested. In this manner, the swine enclosed within the restraint device is further immobilized because its feet are precluded from engaging any supporting surface thereunder.

When the restraint device is elevated above the fixed supporting surface and the feet of the swine extend downwardly through the central opening 6 defined in the bottom surface 4 of the trough, the swine is restrained and immobilized within the V-shaped wedge configuration as a result of gravitational forces acting thereon. Additionally, the free ends of the back restraints 16 and 18, which are respectively received within opposed openings 20 and 22 defined in the inclined blocks 8 and 10, extend through the blocks and are anchored to the fixed or stationary supporting surface upon which the bottom surface 4 of the restraint device 2 initially rests in a non-elevated position. Accordingly, as the restraint device is elevated above the fixed supporting surface, the back restraints 16 and 18 remain stationary relative to the rising bottom surface 4 of the trough. When the trough is raised to a predetermined elevation, the arcuate, upper portions of the forward and rear end back restraints 16 and 18 exert a downward force on the neck and/or back of the swine enclosed within the trough to further immobilize and restrain the swine therein.

It becomes apparent that upon elevation of the restraint device to a height at which the back restraints 16 and 18 are moved into engagement with the swine within the restraint device, the swine is immobilized as a result of 1). the V-shaped wedge in which the swine is received, the central opening in the bottom surface of the trough through which the legs of the swine extend, the gravitational forces acting downwardly on the swine, and the smooth surface of the V-shaped channel impeding upward movement of the swine; 2). the forward shoulder restraints 12 and 14 preventing forward movement by the swine; and 3). the forward and rear back restraints 16 and 18 exerting downward forces on the neck/head and back areas of the swine. As a result of the many separate restraints tending to immobilize the swine in the device of the present invention, both the front and rear end walls 24 and 26 may be selectively removed from the restraint device, as desired by the user, to provide more efficient and less impeded access to the swine within the trough. In this manner, the procedure to be conducted on the swine can be more efficiently and expeditiously performed, and the time in which the swine is immobilized is reduced thereby decreasing the stress and discomfort to the swine. The animal restraint device in accordance with the present invention restrains the animal in several different ways, as discussed above, to enable more complicated procedure, as for example, implantation into the ear of the swine, to be performed in a simplified, safe and efficient manner. The restraint device further provides better balanced, and more equally distributed support of the swine restrained therein as a result of the sloped, V-shaped opposed surfaces provided for laterally supporting the swine instead of the less desirable sternum support of the known devices.

The restraint device in accordance with the present invention advantageously immobilizes a restrained animal in a manner which reduces discomfort, stress and panic, while providing firm and secure temporary immobilization of the restrained animal thereby enabling the restraint device to be employed to efficiently and expeditiously perform procedures on the restrained animal requiring immobilization.

Figure 4:
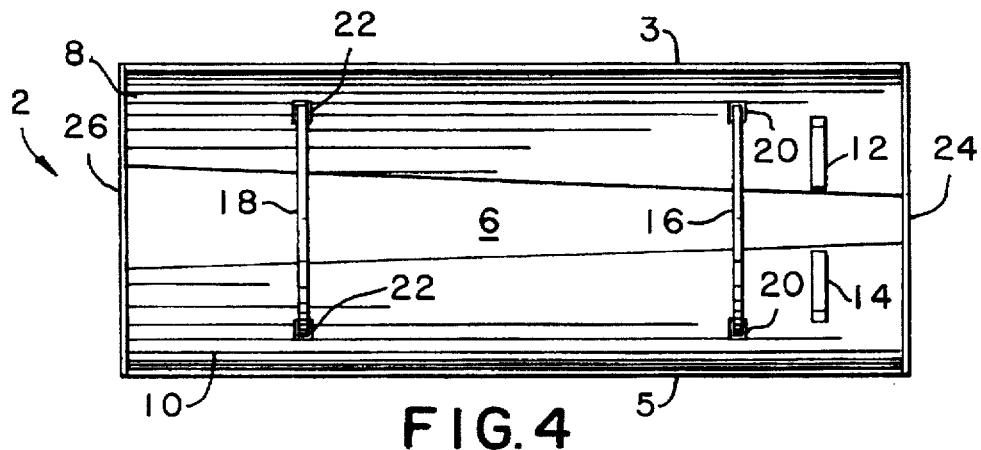
FIG. 4 illustrates a top plan view of the animal restraint device illustrated by FIGS. 1–3 of the drawing.
Figure 5:
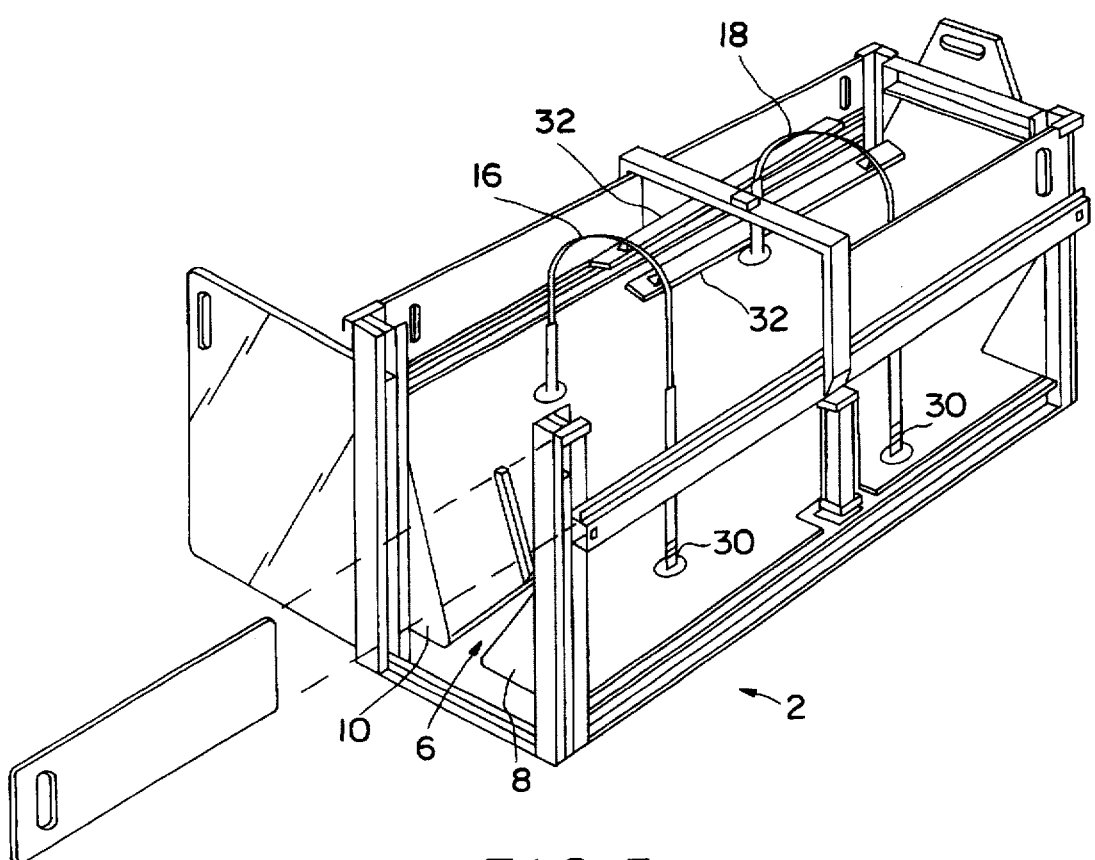
FIG. 5 illustrates a perspective view of a modified embodiment of the animal restraint device of the present invention.
Figure 6:
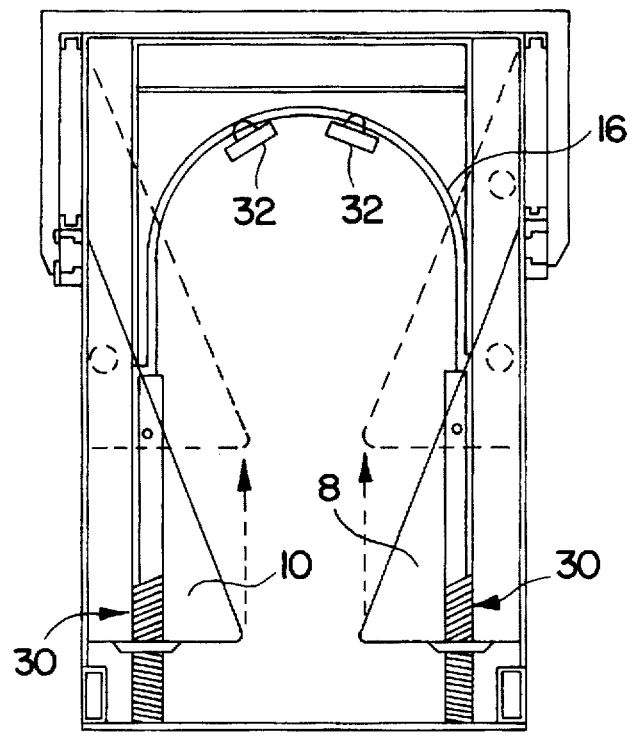
FIG. 6 illustrates a front elevational view of the embodiment of the animal restraint device shown by FIG. 5.
Figure 7:
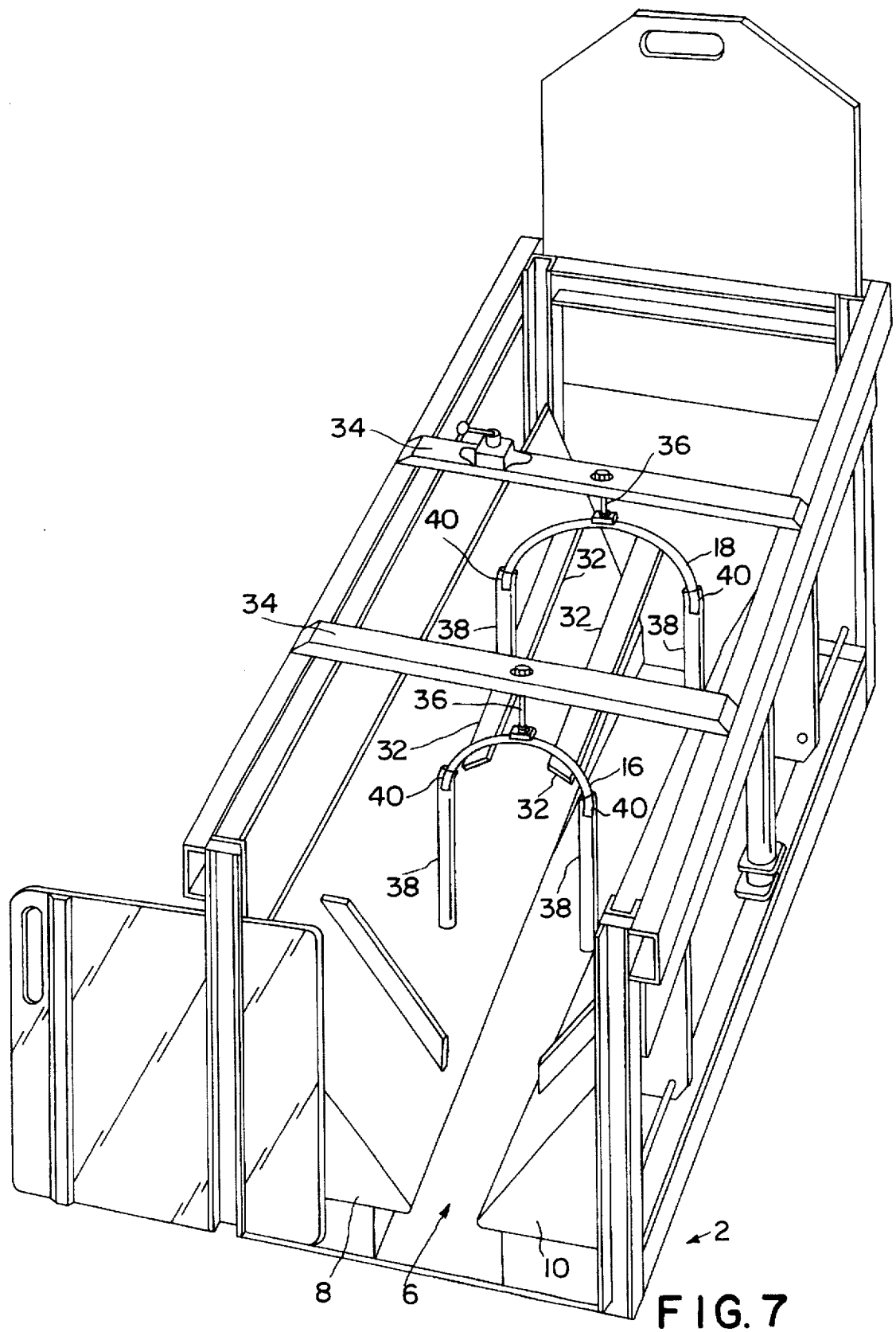
FIG. 7 illustrates a perspective view of a further embodiment of an animal restraint device of the present invention.

FIGS. 5 and 6 illustrate a further embodiment of an animal restraint device in accordance with the present invention. The animal restraint device illustrated by FIGS. 5 and 6 include modifications to the structure of the animal restraint device in accordance with the first embodiment of the invention, previously discussed herein as illustrated by FIGS. 1–4 of the drawings. Accordingly, the same reference numerals will be used to designate the structural elements which are common to both the first and second embodiments of the animal restraint device in accordance with the present invention.

Referring specifically to FIGS. 5 and 6, a first restraining yoke 16 is positioned proximate to the front of the housing 2, while a second restraining yoke 18 is positioned proximate to the rear of the housing 2. Each of the restraining yokes includes two end portions which are mounted to the bottom surface 4 of the housing 2 through the opposed side blocks 8 and 10 longitudinally extending along opposed sides of the housing 2. As illustrated by FIG. 5, the maximum width of the rear yoke 18 (i.e., the distance between the opposed ends of yoke 18) is greater than the maximum width of the front yoke 16 for the purpose of generally conforming to the shape of the animal restrained within the device.

Resilient means are provided on the ends of each of the yokes, the resilient means comprising springs 30 mounted to each of the opposed ends of each of the yokes for exerting a resilient force in the direction in which the yokes are urged against the back of the restrained animal. The springs may be mounted to the ends of the yokes in a conventional manner, as for example, by providing a suitable opening and stop means for each of the springs mounted to each of the ends of the yokes such that movement of the yokes in an upward direction is possible but is opposed by the resilient forces exerted by the spring. Preferably, each of the springs is a 50 pound spring, and the springs are mounted to each of the two opposed ends of each of the pair of restraining yokes. As discussed with respect to the earlier embodiment of the invention, the free ends of the yokes, which now comprise the springs 30, extend through the movable bottom surface of the restraint device through suitably defined openings (as, for example, openings defined in the opposed side blocks), and are mounted to the fixed supporting element or anchored thereunder.

Still referring to FIGS. 5 and 6 of the drawing, a pair of opposed longitudinally extending slats designated by reference numeral 32 are mounted to the inside of the upper portion of each of the yokes 16 and 18. Preferably, each of the two longitudinally extending slats is pivotably mounted to each of the yokes 16 and 18 to permit lateral movement of each slat relative to the yokes. The pivotal mounting of each of the slats to each of the yokes can be accomplished in any conventional manner. As also illustrated by FIG. 5 of the drawings, the pair of opposed, longitudinally extending slats 32 diverge in a direction from the front to the rear of the housing. As discussed above, the width of the rear yoke 18 is greater than the width of front yoke 16 so as to enable the pivotal mounting of the slats to the yokes in the relatively diverging orientation as illustrated by FIG. 5. By mounting the slats to the yokes so that the slats diverge from each other in a longitudinally extending direction from the front to the rear of the housing of the restraint device, the relative orientation of the opposed pair of slats generally conforms to the upper portion of an animal restrained within the restraint device.

Figure 2:
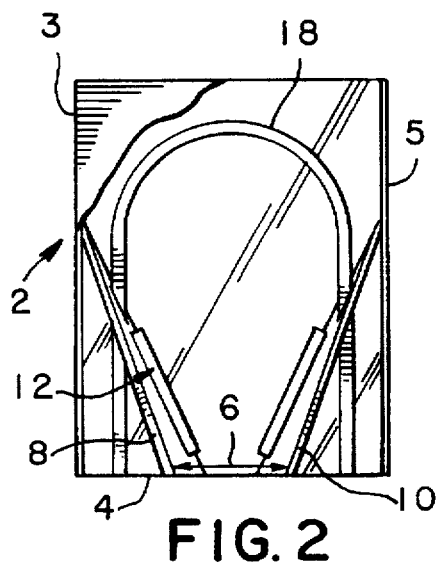
FIG. 2 illustrates a rear elevational view of the device illustrated by FIG. 1.
Figure 3:
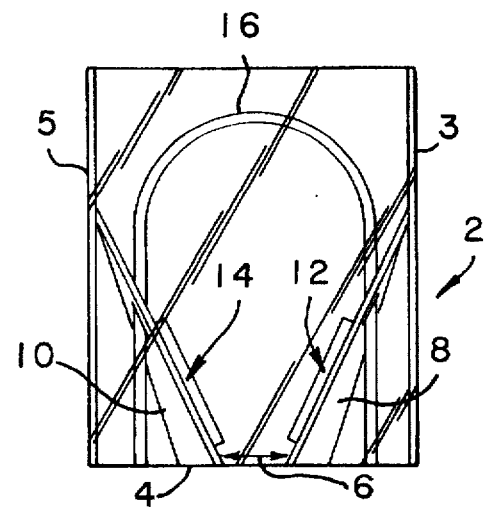
FIG. 3 illustrates a front elevational view of the device illustrated by FIG. 1.

Preferably, the relative orientation of the opposed, longitudinally extending pair of slats 32 conforms to the relative orientation of the diverging opening 6 defined between the opposed stationary side elements 8 and 10, and also generally conforms to the orientation of the decreasing widths of the respective stationary side elements in a direction from the front to the rear of the housing of the restraint device (See FIGS. 2–4).

Front and rear restraining yokes 16 and 18, which are resiliently mounted to the bottom surface of the housing of the animal restraint device, cooperate with the longitudinally extending, opposed pair of slats to more comfortably and securely restrain an animal within the housing, and to more evenly distribute the restraining force of the yokes 16 and 18 across the entire back of the restrained animal. As discussed with respect to the embodiment of the invention illustrated by FIGS. 1–4, means are provided for selectively elevating the housing relative to a fixed supporting surface and the front and rear restraining yokes 16 and 18 such that the back of an animal restrained within the housing engages the front and rear yokes 16 and 18 as the housing is elevated relative to the fixed supporting surface. However, in the embodiment of the invention illustrated by FIGS. 5 and 6, the two free ends of each of the yokes 16 and 18 are resiliently mounted to the fixed supporting surface to which the housing is relatively vertically movable. In this manner, as the housing is elevated relative to the fixed supporting surface and the back of the restrained animal is engaged by the top arcuate portion of the yokes 16 and 18, the yokes are movable relative to the bottom surface of the elevated housing, to a limited degree, as a result of the resilient mounting of the ends of the yokes to the housing. Accordingly, the inner, top curved portion of the yokes exert downwardly directed forces on the back of the restrained animal to firmly and safely secure the restrained animal within the elevated housing.

When the upper back of the animal restrained within the elevated housing is raised proximate to the upper portion of the yokes 16 and 18, the back of the animal will engage the opposed longitudinally extending slats pivotably mounted to the inner, upper portions of the forward and rearwardly oriented yokes 16 and 18. In this manner, the force or pressure which would otherwise be applied to only two separate areas on the upper back of the restrained animal, is now effectively uniformly distributed along the entire back of the restrained animal by the slats. The diverging orientation of the opposed, longitudinally extending slats conforms to the general shape of the back of the restrained animal, as discussed above. Accordingly, the opposed, longitudinally extending slats firmly secure the restrained animal within the elevated housing by extending across the entire back of the restrained animal by the slats. Moreover, the animal is more safely and comfortably restrained within the elevated housing because the restraining force of the two restraining yokes is more evenly and uniformly distributed across the back of the restrained animal, and not just applied to two separate and distinct areas proximate to the front and rear of the restrained animal. By pivotably mounting the pair of opposed, longitudinally extending slats to the upper portion of the pair of front and rear yokes 16 and 18, the slats are movable to adjust their relative orientation to more closely conform to the specific shape of the animal restrained within the housing to securely and firmly retain the animal within the housing, and to assure that the restraining force applied by the yokes will be effectively and uniformly distributed across the entire back of the restrained animal.

Although the embodiment of the invention illustrated by FIGS. 5 and 6 discloses a device including the pivotably mounted longitudinally extending slats 32 in combination with the resilient means mounted to the free ends of the front and rear yoke-shaped restraints, it is within the scope of the invention to provide animal restraint devices including each of these features individually and not in combination with each other. Accordingly, the present invention includes animal restraint devices having longitudinally extending, opposed slats which are pivotably mounted proximate to the top portion of the yoke-shaped restraint, without including resilient elements mounted to the free ends of the restraint.

FIGS. 7–10 illustrate a further embodiment of an animal restraint device in accordance with the present invention. Elements of this embodiment of the invention corresponding to elements of the previously discussed embodiments have been designated with the same reference numerals.

Referring specifically to FIGS. 7–10, the illustrated animal restraint device includes forward and rear yoke-shaped back restraint elements, the front restraint 16 being narrower in width than the rear restraint 18. The free end 40 of the respective restraints 16 and 18 are received within the top portions of upwardly extending, tube shaped elements 38, the bottom portions of which are mounted respectively to the inclined, supporting elements (side blocks) 8 and 10. The tubes 38 are formed from a plastic material so as to comfortably restrain an animal within the yoke-shaped restraints, and the ends 40 of the yokes 16 and 18 are received within the tubes in telescoping relationship so as to adjust the height of the respective yokes. The height adjustment is accomplished by a threaded rod 36 mounted to the outer surface of the upper peak of the respective yokes, and extending upwardly therefrom into an overhead supporting, cross element 34 extending in a substantially transverse orientation across the top of the housing of the restraint device.

Figure 8:
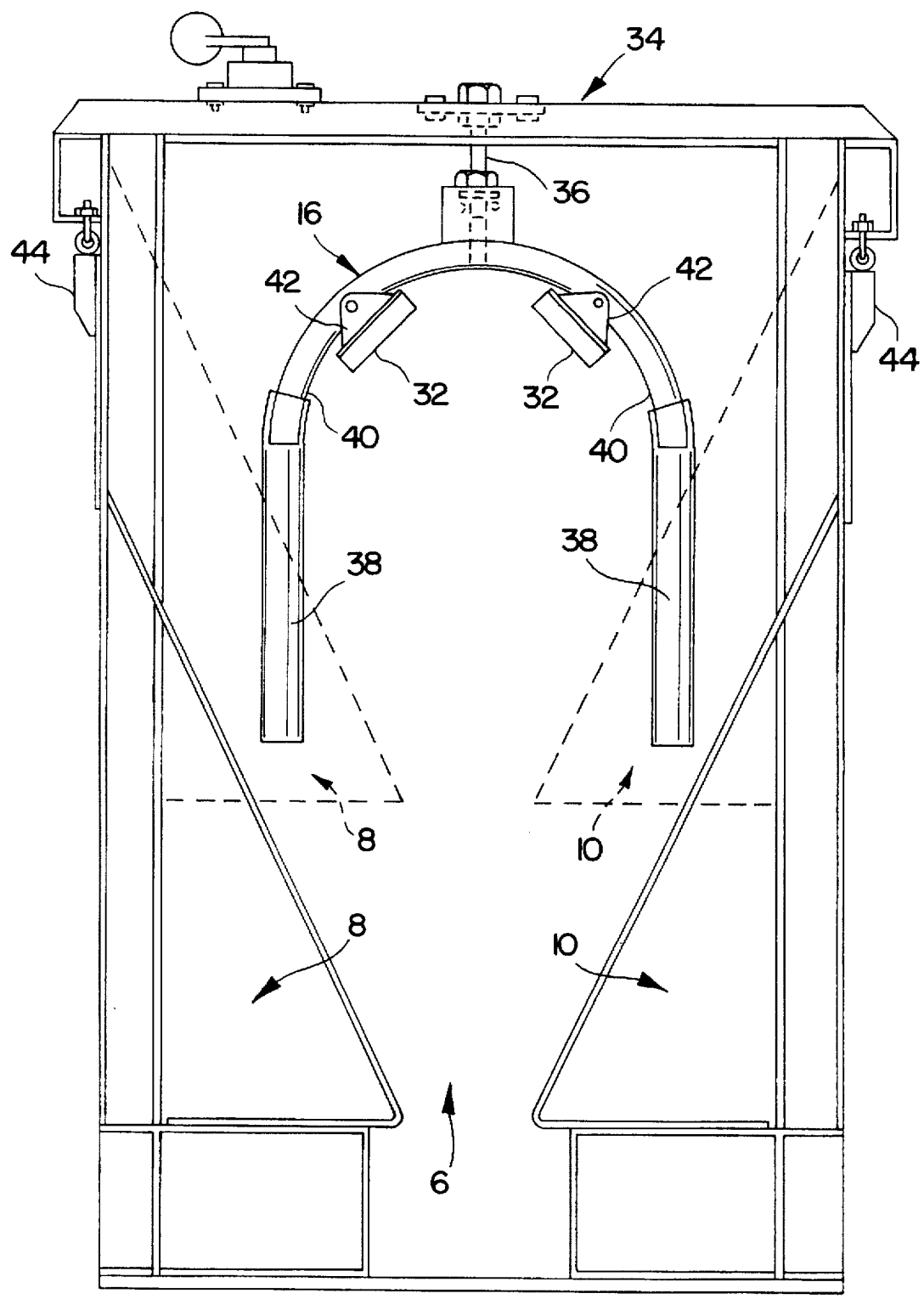
FIG. 8 is a front elevational view of the device of FIG. 7.
Figure 9:
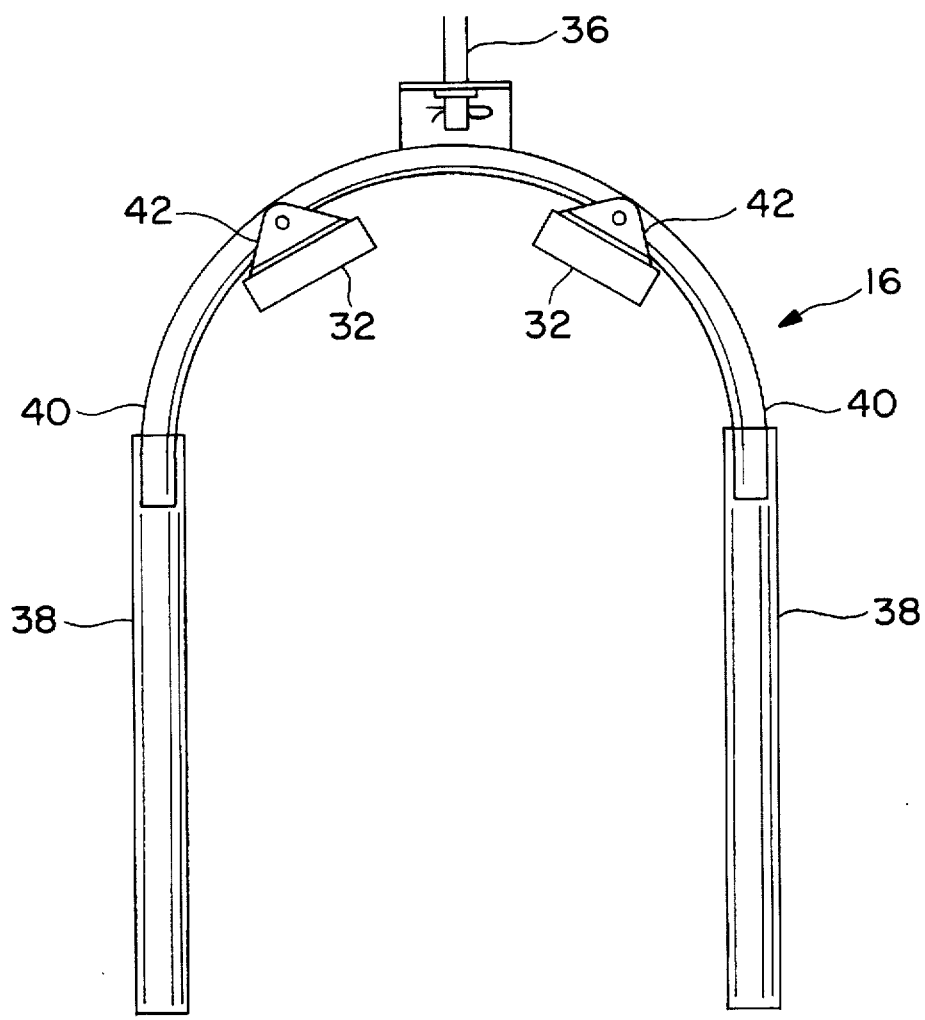
FIG. 9 illustrates a front yoke-shaped restraint of the device of FIG. 7.
Figure 10:
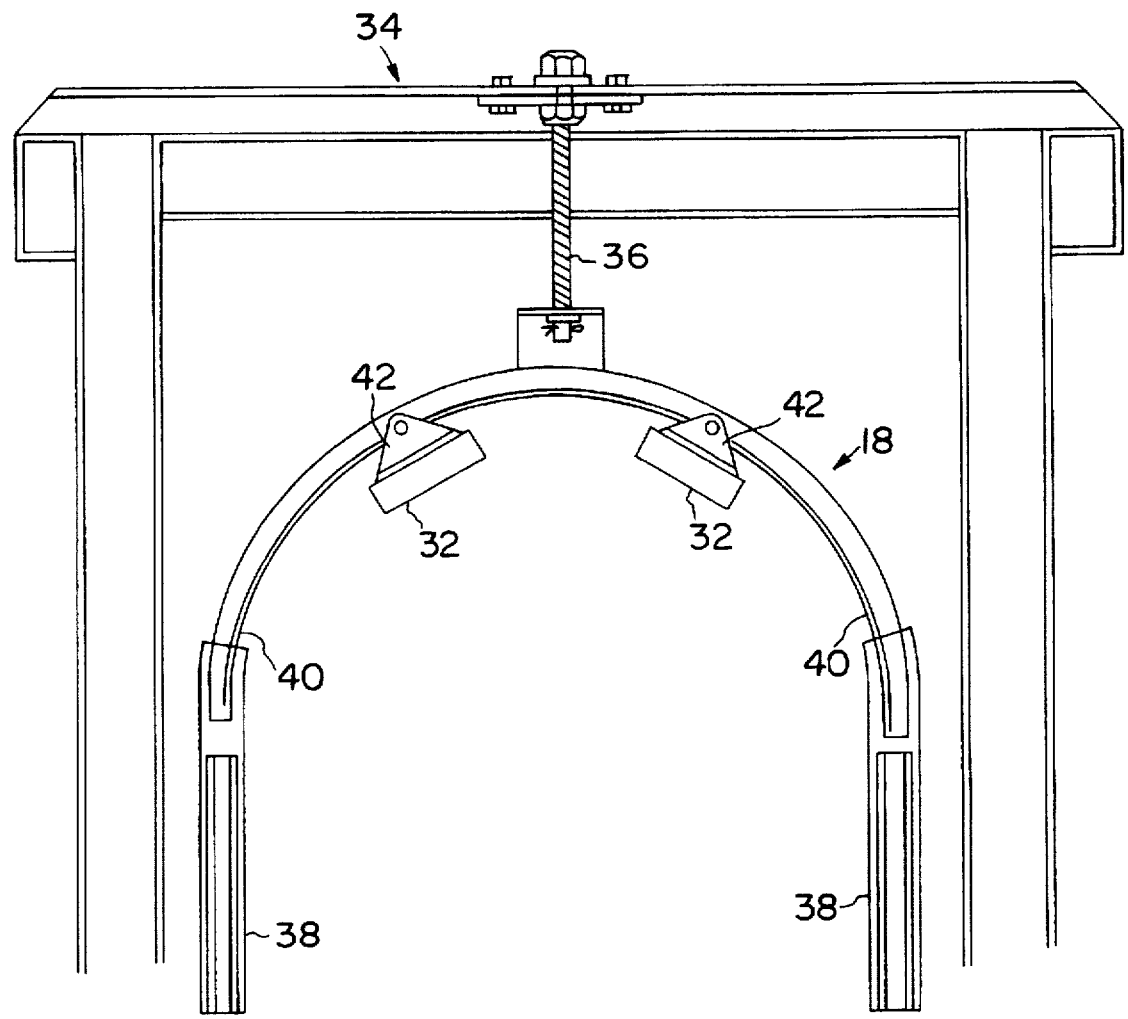
FIG. 10 illustrates a rear yoke-shaped restraint of the device of FIG. 7.

As discussed with respect to the earlier embodiments of the invention, a pair of opposed, longitudinally extending slats 32 are mounted proximate to upper inner portions of the the front and rear restraining yokes 16 and 18 for the purpose of uniformly distributing the downwardly directed restraining forces of the yokes across the entire back of an animal restrained within the device. FIGS. 8–10 illustrate conventional means, designated by reference numeral 42, for pivotably mounting the pair of opposed slats 32 to inner, upper portions of both the front and rear restraining yokes 16 and 18.

In the embodiment of the invention illustrated by FIGS. 7–10, the animal restraint device includes the longitudinally extending, pivotably mounted slats 32, but does not include the resilient elements 30 associated with the free ends of the restraining yokes 16 and 18. In the present embodiment, as more clearly illustrated by FIG. 8, the lower portions of the tubes 38, which receive the free ends 40 of the restraining yokes 16 and 18, are fixedly mounted to the supporting side blocks 8 and 10, to be elevated and lowered together with the side blocks. The elevated position of the supporting side blocks 8 and 10, and that of the yoke structure 16 including the free ends 40 thereof received in the pair of opposed tubes 38 fixedly mounted to the blocks 8 and 10, is shown in dotted line as illustrated by FIG. 8. Accordingly, unlike the previously discussed embodiments of the invention, the embodiment illustrated by FIGS. 7–10 provides an animal restraint device in which the supporting pair of side blocks, together with the front and rear yoke-shaped back restraints, are movable as a single unit. Means for elevating and lowering the side blocks 8 and 10 together with the restraining yokes, is designated by reference numeral 44 in FIG. 8, and comprises conventional means, as for example, hydraulic or pneumatic piston-cylinder means.

Other modifications and advantages of the animal restraint device within the scope of the present invention will become apparent to those skilled in the art. Accordingly, the above discussion of the best modes for carrying out the invention is intended to be illustrative only and not restrictive of the scope of the invention, that scope being defined by the following claims and all equivalents thereto.

I claim:

1. An animal restraint device comprising:
   a housing defining a pair of stationary elements for supporting an animal restrained within said housing;
   at least one restraining element bridging said supporting stationary elements; and
   at least one longitudinally extending slat mounted to said at least one restraining element, said slat being adapted to engage an animal restrained within said housing.

2. The animal restraint device as claimed in claim 1 further comprising at least two longitudinally extending slats mounted to said at least one restraining element, said two slats being adapted to engage an animal restrained within said housing.

3. The animal restraint device as claimed in claim 2 comprising at least two of said restraining elements including a front restraining element and a rear restraining element, each of said two longitudinally extending slats being mounted to both said front and rear restraining elements.

4. The animal restraint device as claimed in claim 3 further including means for pivotably mounting each of said two longitudinally extending slats to each of said front and rear restraining elements.

5. The animal restraint device as claimed in claim 3 wherein said front restraining element is narrower in maximum width than said rear restraining element.

6. The animal restraint device as claimed in claim 5 wherein two longitudinally extending slats mounted to said front and rear restraining element are oriented to diverge from each other in a direction from said front restraining element towards said rear restraining element.

7. The animal restraint device as claimed in claim 6 wherein at least one of said two longitudinally extending slats is pivotably mounted to both said front and rear restraining elements.

8. The animal restraint device as claimed in claim 3 further including means for resiliently mounting both said front and said rear restraining elements to a supporting surface.

9. The animal restraint device as claimed in claim 1 further including means for pivotably mounting said at least one longitudinally extending slat to said at least one restraining element.

10. The animal restraint device as claimed in claim 1 further including means for resiliently mounting said at least one restraining element to a supporting surface.

11. The animal restraint device as claimed in claim 1 further including means for selectively elevating said supporting stationary elements.

12. An animal restraint device comprising:
    a housing including a pair of supporting stationary elements;
    at least one restraining element bridging said pair of supporting stationary elements, said restraining element having two free ends mounted to a supporting surface; and
    means for resiliently mounting said free ends of said at least one restraining element to said supporting surface.

13. The animal restraint device as claimed in claim 12 further including at least two of said restraining elements including a front restraining element and a rear restraining element, and said means further including means for resiliently mounting both said front and rear restraining elements to said supporting surface.

14. The animal restraint device as claimed in claim 12 further including at least one longitudinally extending slat mounted to said at least one restraining element.

15. The animal restraint device as claimed in claim 14 further including means for pivotably mounting said at least one longitudinally extending slat to said at least one restraining element.

16. An animal restraint device comprising:
    a housing comprising a pair of supporting stationary elements;
    at least one tube element mounted to each of said pair of supporting stationary elements and extending upwardly therefrom;
    at least one restraining element bridging said pair of supporting stationary elements, said restraining element having two free ends, each of said free ends being received within a different one of said tube elements.

17. The animal restraint device as claimed in claim 16 wherein said free ends of said at least one restraining device are received in said tube elements in telescoping relationship therewith, said device further including means for selectively adjusting the height of said at least said one restraining element.

18. The animal restraint device as claimed in claim 16 further including at least one longitudinally extending slat mounted to said at least one restraining element.

19. An animal restraint device as claimed in claim 18 further including means for pivotably mounting said at least one longitudinally extending slat to said at least one restraining element.

20. The animal restraint device as claimed in claim 19 including means for selectively elevating, as a single unit, said at least one restraining element, together with said pair of supporting stationary elements, and said two elements mounted to said pair of supporting stationary elements, and said longitudinally extending slat pivotably mounted to said at least one restraining element.

* * * * *